(12) United States Patent  
Cui et al.

(10) Patent No.: US 9,424,011 B2  
(45) Date of Patent: Aug. 23, 2016

(54) RECURSIVE EXPRESSION SIMPLIFICATION

(71) Applicant: International Business Machines Corporation, Armonk, NY (US)

(72) Inventors: Shimin Cui, Toronto (CA); Yaoqing Gao, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/231,895

(22) Filed: Apr. 1, 2014

(65) Prior Publication Data

US 2015/0277871 A1 Oct. 1, 2015

(51) Int. Cl.  
*G06F 9/45* (2006.01)

(52) U.S. Cl.  
CPC .............. *G06F 8/443* (2013.01); *G06F 8/4441* (2013.01)

(58) Field of Classification Search  
CPC ....................................................... G06F 8/443  
See application file for complete search history.

(56) References Cited

U.S. PATENT DOCUMENTS

| | | | | |
|---|---|---|---|---|
| 5,842,022 | A * | 11/1998 | Nakahira et al. | 717/160 |
| 7,089,545 | B2 | 8/2006 | Bera | |
| 2001/0016901 | A1 * | 8/2001 | Topham | 712/217 |
| 2004/0117781 | A1 * | 6/2004 | Bera | 717/160 |
| 2009/0055815 | A1 * | 2/2009 | Chan | 717/160 |
| 2011/0225573 | A1 | 9/2011 | Zaafrani | |
| 2015/0277873 | A1 | 10/2015 | Cui | |

OTHER PUBLICATIONS

Appendix P List of IBM Patents or Patent Applications Treated as Related.  
Cui, S. et al. U.S. Appl. No. 14/603,862, filed Jan. 23, 2015.

* cited by examiner

*Primary Examiner* — James D Rutten  
(74) *Attorney, Agent, or Firm* — John W. Hayes; William H. Hartwell

(57) ABSTRACT

A computer-implemented method, carried out by one or more processors, for recursive expression reduction. In an embodiment, the method comprises the steps of identifying a candidate loop, where the candidate loop includes at least one or more reduction variables and reduction operations; altering grouping of loop invariants and loop variants within the candidate loop; and performing recursive expression simplification for an inner loop, wherein the inner loop is located within the candidate loop.

8 Claims, 3 Drawing Sheets

RECURSIVE EXPRESSION SIMPLIFICATION

BACKGROUND OF THE INVENTION

Currently, loop invariant code motion is an understood optimization in which an invariant computation is moved out of a loop without affecting the semantics of the program. Moving the invariant computation out of the loop allows for the calculation of a value to occur once and for the calculated value to be used multiple times within the loop. A computation is considered loop invariant if the computation contains no memory operands that can be affected during the execution of the loop. Since unnecessary calculations within the loop are removed outside of the loop, the runtime performance increases. However, within the loop there may be additional recurring calculations which can affect runtime performance.

SUMMARY

Embodiments in accordance with the present invention disclose a method, computer program product and computer system for recursive expression simplification. A computer-implemented method, carried out by one or more processors, for recursive expression simplification comprises the steps of identifying, by one or more processors, a candidate loop, where the candidate loop includes at least one or more reduction variables and reduction operations; altering, by one or more processors, grouping of loop invariants and loop variants within the candidate loop; and performing, by one or more processors, recursive expression simplification for an inner loop, wherein the inner loop is located within the candidate loop.

DETAILED DESCRIPTION

Embodiments in accordance with the present invention perform recursive expression simplification by identifying a candidate loop, where the candidate loop includes at least one or more reduction variables and reduction operations. Embodiments in accordance with the present invention can alter grouping of loop invariants and loop variants within the candidate loop. Upon altering the grouping of loop invariants and loop variants, embodiments in accordance with the present invention can perform recursive expression simplification for an inner loop, wherein the inner loop is located within the candidate loop.

Recursive expression simplification can include creating a new reduction variable and a prologue statement, wherein the prologue statement initializes the new reduction variable based on at least a reduction operator type. Subsequently, recursive expression simplification can replace an original loop reduction variable in the candidate loop with the new reduction variable and create an epilogue statement, wherein the epilogue statement represents the replacement of the original loop reduction variable.

Figure 1:
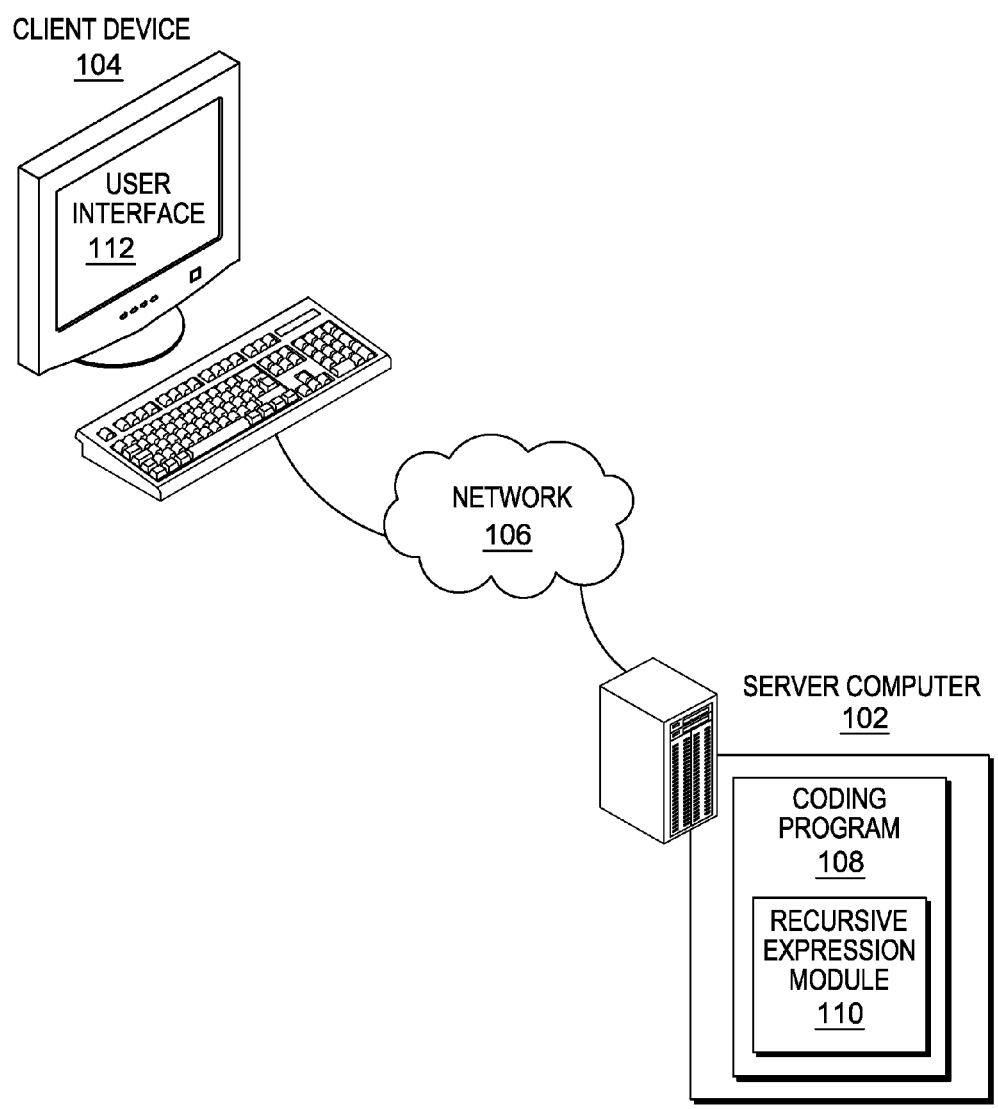
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and client device 104 interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

Coding program 108 can be a computer program capable of creating a sequence of instructions that can automate performing a specific task or solve a given problem. Coding program 108 includes source code or object code which a user of client device 104 can manipulate to create the sequence of instructions. The source code and object code can be written in one or more computer programming languages that can include but is not limited to C, C++, C#, Java™, Javascript™, and Python™. Recursive expression module 110 located in coding program 108, has the ability to provide recursive expression simplification with invariant loop motion for reducing computations. Recursive expression module 110 can remove invariant code in a reduction assignment in a loop based on a distributive property of the reduction operation. Recursive expression module 110 can calculate a value of the reduction variable using the loop results, where the loop results are at the end of the loop.

In general, network 106 can be any combination of connections and protocols that will support communications between server computer 102 and client device 104. Network 106 can include, for example, a local area network (LAN), a wide area network (WAN) such as the internet, a cellular network, or any combination of the preceding, and can further include wired, wireless, and/or fiber optic connections. In one embodiment, coding program 108 with recursive expression module 110 may be a web service accessible via network 106 to a user of a separate device (e.g., client device 104). In another embodiment, coding program 108 with recursive expression module 110 may be operated directly by a user of server computer 102.

In various embodiments of the present invention, client device 104 can be a laptop computer, a tablet computer, a netbook computer, a personal computer (PC), a desktop computer, a personal digital assistant (PDA), a smartphone, or any programmable electronic device capable of communicating with server computer 102 via network 106. A user of client device 104 can operate coding program 108 with recursive expression module 110 via user interface 112.

User interface (UI) 112 on client device 104 displays information that any one of the processes of coding program 108 with recursive expression module 110 may display to a user. User interface 112 can be, for example, a graphical user interface (GUI) or a web user interface (WUI) that displays text, documents, web browser windows, user options, application interfaces and instructions for operation. User interface 112 also has the ability to receive user inputs for coding program 108 with recursive expression module 110.

Figure 2:
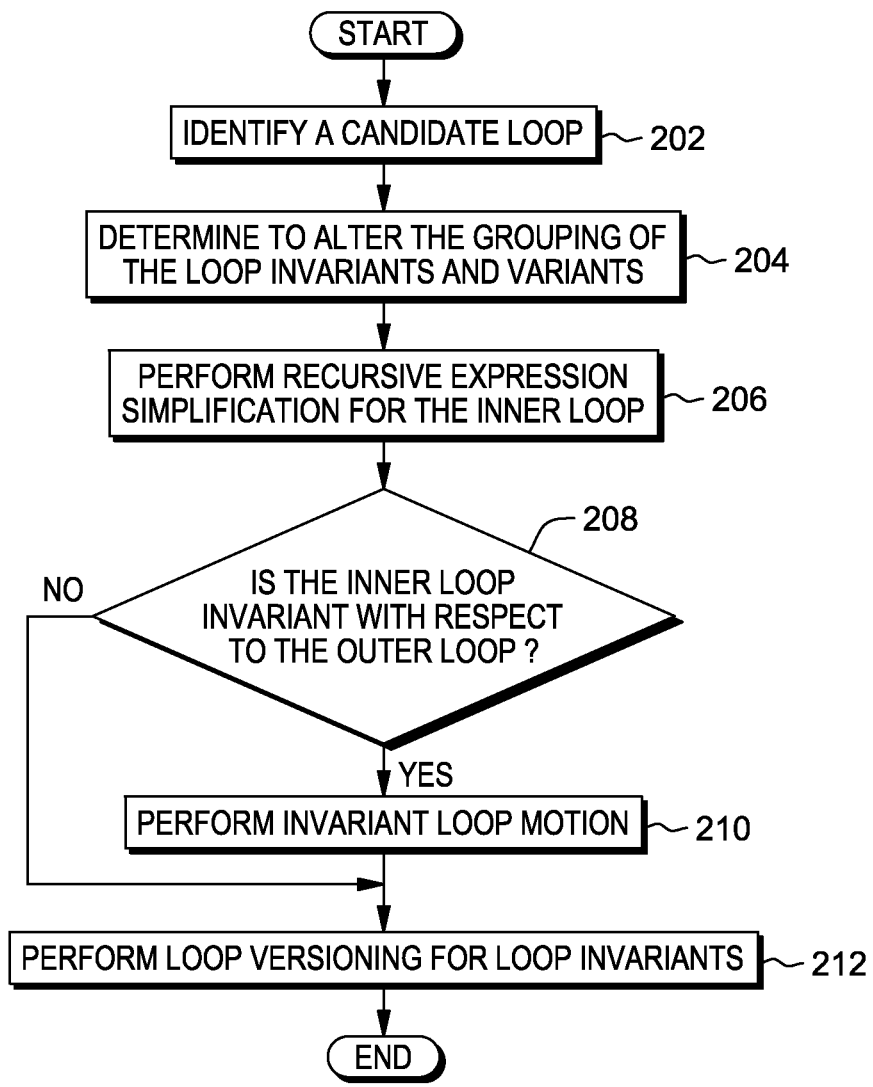
FIG. 2 is a flowchart depicting operational steps of a recursive expression module for expression simplification with invariant loop motion, in accordance with an embodiment of the present invention.

FIG. 2 is a flowchart depicting operational steps of a recursive expression module for expression simplification with invariant loop motion, in accordance with an embodiment of the present invention.

Recursive expression module 110 identifies a candidate loop (step 202). Recursive expression module 110 identifies a candidate loop with safety analysis by determining control flow and data flow. Recursive expression module 110 identifies reduction variables and valid reduction operation in loops and identifies loop invariants and loop variants. In an example, recursive expression module 110 identifies an original loop as shown in Table 1 and a loop nest with an innermost candidate loop as shown in Table 2.

TABLE 1

Original loop

```
for(i=0; i<reg->size; i++) {
  ...
  pat2 = 0;
  for(j=0; j<width; j++) {
    pat2 += reg->node[i].state & ((MAX_UNSIGNED)1<<(width+j));
  }
  ...
}
```

TABLE 2

Loop Nest with an Innermost Candidate loop

```
for(j=0; j<width; j++) {
  pat2 += reg->node[i].state & ((MAX_UNSIGNED)1<<(width+j));
}
```

In this example, recursive expression module 110 identifies pat2 as a reduction variable and reg->node[i].state as a loop invariant.

Recursive expression module 110 determines to alter the grouping of the loop invariants and variants (step 204). Recursive expression module 110 alters the grouping of the invariants and variants by utilizing associative and commutative operations to maximize the invariant groups. Continuing from the previous example shown in Table 2, reg->node[i].state & ((MAX_UNSIGNED)1<<(width+j)) is grouped in invariants and variants. Recursive expression module 110 alters the grouping of the invariants and variants by identifying reg->node[i].state as the invariant in the loop and ((MAX_UNSIGNED)1<<(width+j)) as the variant in the loop.

Recursive expression module 110 performs recursive expression simplification for the inner loop (step 206). In one embodiment, recursive expression module 110 creates a new reduction variable (newRV) and a prologue statement to initialize the new reduction variable (newRV) based on the reduction operator type. Recursive expression module 110 replaces an original loop reduction variable (Rv) in the loop body with the new reduction variable (newRV) and transforms a loop statement RV=RV+variants*invariants to a new loop statement newRV=newRV+invariants. Recursive expression module 110 creates an epilogue statement to achieve the final result RV=RV+variants*newRV. In one example, recursive expression module 110 identifies a reduction operator as '+' and invariant and variant operation as '*'. For an original loop, RV=RV+(variants*invariants), recursive expression module 110 transforms the original loop to a new loop newRV=newRV+variants, where RV=RV+(newRV*invariants).

Continuing from the previous example shown in Table 2, recursive expression module 110 can perform simplification on the recursive expression pat2+=reg->node[i].state & ((MAX_UNSIGNED)1<<(width+j)). Recursive expression module 110 can remove the operation '&' with the invariant expression of reg->node[i].state in the inner reduction loop. Recursive expression module 110 determines the inner loop is to compute the reduction factor pat20 as shown in Table 3.

TABLE 3

Computation of the Reduction Factor

```
int pat20 = 0;
for(j=0; j<width; j++) {
  pat20 += ((MAX_UNSIGNED)1<<(width + j));
}
```

Recursive expression module 110 determines if the inner loop is invariant with respect to the outer loop (decision step 208). In the event recursive expression module 110 determines the inner loop is not invariant with respect to the outer loop ("no" branch, step 208), recursive expression module 110 performs loop versioning for loop invariants (step 212). In the event recursive expression module determines the inner loop is invariant with respect to the outer loop ("yes" branch, step 208), recursive expression module 110 performs invariant loop motion (step 210). Continuing from the previous example shown in Table 3, recursive expression module identifies the inner loop is invariant with respect to outer loop and performs invariant loop motion as shown in Table 4. Recursive expression module 110 moves the innermost loop out of the outer loop.

TABLE 4

Invariant Loop Motion

```
int pat200 = 0;
for (j=0; j<width; j++) {
  pat200 += ((MAX_UNSIGNED)1<<(width + j));
}
for (i=0; i<reg->size; i++){
  ...
  pat2 = 0;
  int pat20 = 0;
  pat20 = pat20 + pat200;
  pat2 = pat2 + reg->node[i].state & pat20;
  ...
}
```

Recursive expression module 110 performs loop versioning for loop invariants (step 212). In one embodiment, recursive expression module 110 performs loop versioning if loop invariants have frequently utilized values. Recursive expression module 110 performs static analysis for value range propagation or, in another embodiment, runtime profiling feedback to obtain the frequently utilized values for the invariants. Recursive expression module 110 performs loop versioning utilizing the frequently utilized values and performs partial compile time simplification.

Continuing from the previous example shown in Table 4, recursive expression module 110 examines the reduction loop 'j'. Recursive expression module 110 identifies the variable 'width' as the invariant with known values at runtime. Based on profile feedback information, recursive expression module 110 identifies the frequently utilized values as ' ' and ' ' at runtime. Recursive expression module 110 performs loop versioning and the resulting transformed code is shown in Table 5.

TABLE 5

Loop Versioning Transformed Code

```
if (width == 8){
    int pat200 = 0;
    for(j=0; j<width; j++) {
        pat200 += ((MAX_UNSIGNED)1<<(width+j));
    }
} else if (width == 11){
    int pat200 = 0;
    for(j=10; j<width; j++){
        pat200 += ((MAX_UNSIGNED)1<<(width+j));
    }
} else {
    int pat200 = 0;
    for(j=0; j<width; j++){
        pat200 += ((MAX_UNSIGNED)1<<(width+j));
    }
}
```

Recursive expression module 110 can further simplify the code by eliminating loops for most common cases. The final code, recursive expression module 110 achieves is shown in Table 6.

TABLE 6

Final Simplified Code

```
if (width == 8){
    pat200 = 0x7f800;
} else if (width == 11){
    pat200 = 0x3ff800;
} else {
    int pat200 = 0;
    for(j=0; j<width; j++){
        pat200 += ((MAX_UNSIGNED)1<<(width+j));
    }
}
```

Figure 3:
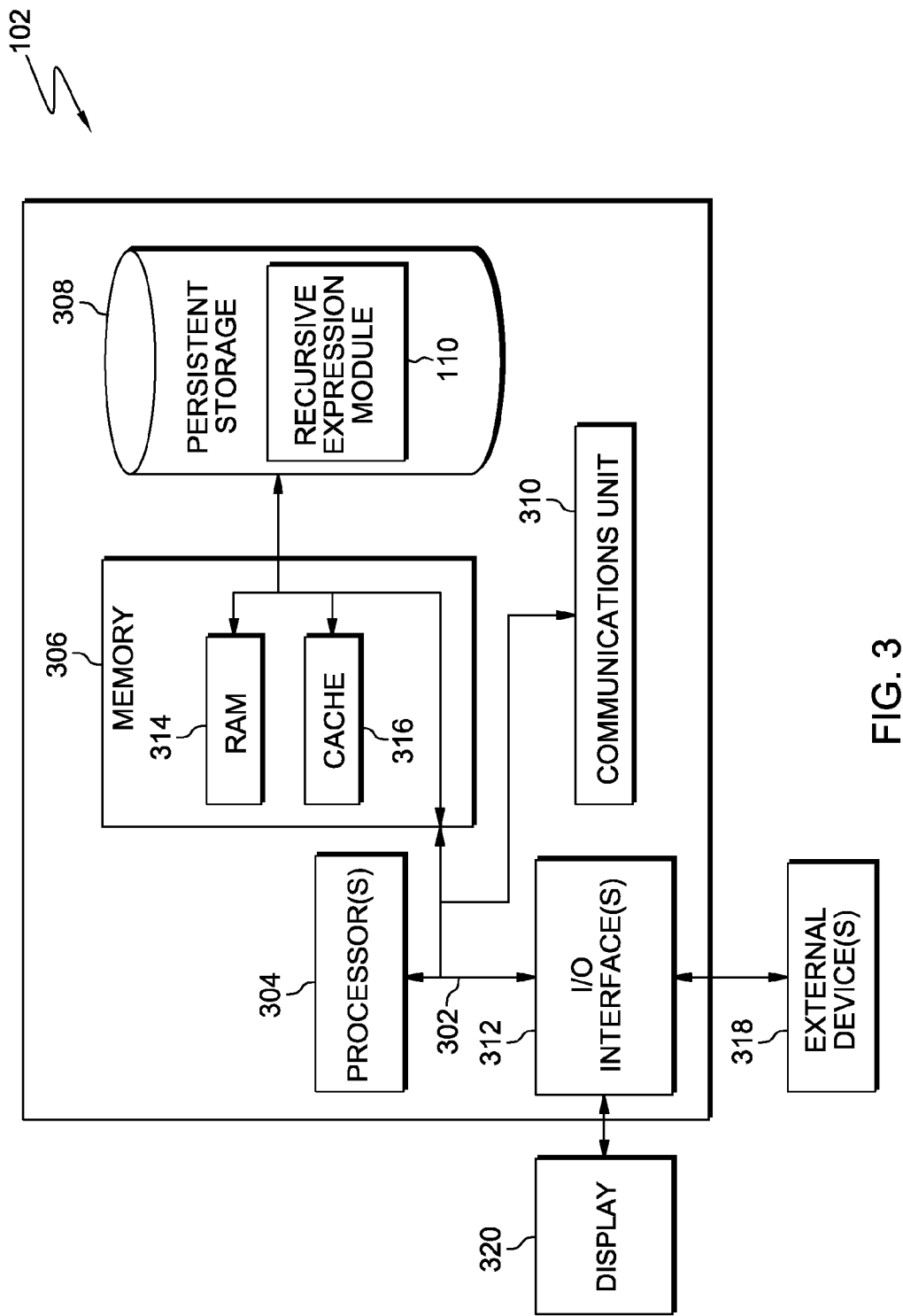
FIG. 3 is a block diagram of components of a computer system, such as the server computer of FIG. 1, in accordance with an embodiment of the present invention.

FIG. 3 depicts a block diagram of components of a computer, such as server computer 102, hosting recursive expression module 110 within distributed data processing environment, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 102 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are examples of computer readable tangible storage devices. A storage device is any piece of hardware that is capable of storing information, such as, data, program code in functional form, and/or other suitable information on a temporary basis and/or permanent basis. In this embodiment, memory 306 includes random access memory (RAM) 314 and cache memory 316. In general, memory 306 can include any suitable volatile or non-volatile computer readable storage device.

Recursive expression module 110 is stored in persistent storage 308 for execution by one or more of computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage medium that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including systems and devices within or controlled by server computer 102. In these examples, communications unit 310 includes one or more wireless network interface cards. Communications unit 310 may provide communications through the use of either or both physical and wireless communications links. Computer programs and processes, such as recursive expression module 110, may be downloaded to persistent storage 308 through communications unit 310, or uploaded to another system through communications unit 310.

I/O interface(s) 312 allows for input and output of data with other devices that may be connected to server computer 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments in accordance with the present invention can be stored on such portable computer readable storage media and can be loaded onto persistent storage 308 via I/O interface(s) 312. I/O interface(s) 312 may also connect to a display 320.

Display 320 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for recursive expression simplification, the computer program product comprising:
   one or more computer readable tangible storage media and program instructions stored on at least one of the one or more storage media, the program instructions comprising:
   program instructions to identify a candidate loop, where the candidate loop includes one or more reduction variables and reduction operations;
   program instructions to alter grouping of loop invariants and loop variants within the candidate loop;
   program instructions to perform recursive expression simplification for an inner loop located within the candidate loop, wherein recursive expression simplification includes removing a mathematical operation from the inner loop and combining the removed mathematical operation with a result of an iterative calculation of the inner loop;
   program instructions to create a new reduction variable, wherein the new reduction variable is equal to the result of the iterative calculation of the inner loop;

program instructions to create a prologue statement, wherein the prologue statement initializes the new reduction variable based on at least the removed mathematical operation;

program instructions to replace an original loop reduction variable in the candidate loop with the new reduction variable;

program instructions to create an epilogue statement, wherein the epilogue statement represents the replacement of the original loop reduction variable, such that the removed mathematical operation is performed subsequent to the iterative calculation of the inner loop;

program instructions to determine if the inner loop is invariant with respect to an outer loop, wherein the outer loop is located within the candidate loop; and program instruction to, responsive to determining the inner loop is invariant with respect to the outer loop, perform invariant loop motion.

2. The computer program product of claim 1, further comprising program instructions, stored on the one or more computer readable storage media, which when executed by a processor, cause the processor to:

determine if loop invariants have one or more frequently utilized values; and responsive to determining the loop invariants have one or more frequently utilized values, perform loop versioning for the loop invariants.

3. The computer program product of claim 1, wherein the program instructions to identify a candidate loop comprise program instructions, stored on the one or more computer readable storage media, which when executed by a processor, cause the processor to:

receive the candidate loop;

identify the at least one or more reduction variables and the reduction operation in the candidate loop; and identify the loop variants and the loop invariants.

4. The computer program product of claim 1, further comprising program instructions, stored on the one or more computer readable storage media, which when executed by a processor, cause the processor to:

determine if the inner loop is invariant with respect to an outer loop, wherein the outer loop is located within the candidate loop;

responsive to determining the inner loop is not invariant with respect to the outer loop, determine if loop invariants have one or more frequently utilized values; and responsive to determining the loop invariants have one or more frequently utilized values, perform loop versioning for the loop invariants.

5. A computer system for recursive expression simplification, the computer system comprising:

one or more computer processors;

one or more computer readable storage media; and program instructions stored on the computer readable storage media for execution by at least one of the one or more computer processors, the program instructions comprising:

program instructions to identify a candidate loop, where the candidate loop includes one or more reduction variables and reduction operations;

program instructions to alter grouping of loop invariants and loop variants within the candidate loop;

program instructions to perform recursive expression simplification for an inner loop located within the candidate loop, wherein recursive expression simplification includes removing a mathematical operation from the inner loop and combining the removed mathematical operation with a result of an iterative calculation of the inner loop;

program instructions to create a new reduction variable, wherein the new reduction variable is equal to the result of the iterative calculation of the inner loop;

program instructions to create a prologue statement, wherein the prologue statement initializes the new reduction variable based on at least the removed mathematical operation;

program instructions to replace an original loop reduction variable in the candidate loop with the new reduction variable;

program instructions to create an epilogue statement, wherein the epilogue statement represents the replacement of the original loop reduction variable, such that the removed mathematical operation is performed subsequent to the iterative calculation of the inner loop;

program instructions to determine if the inner loop is invariant with respect to an outer loop, wherein the outer loop is located within the candidate loop; and program instruction to, responsive to determining the inner loop is invariant with respect to the outer loop, perform invariant loop motion.

6. The computer system of claim 5, further comprising program instructions, stored on the one or more computer readable storage media, which when executed by a processor, cause the processor to:

determine if loop invariants have one or more frequently utilized values; and responsive to determining the loop invariants have one or more frequently utilized values, perform loop versioning for the loop invariants.

7. The computer system of claim 5, wherein the program instructions to identify a candidate loop comprise program instructions, stored on the one or more computer readable storage media, which when executed by a processor, cause the processor to:

receive the candidate loop;

identify the at least one or more reduction variables and the reduction operation in the candidate loop; and identify the loop variants and the loop invariants.

8. The computer system of claim 5, further comprising program instructions, stored on the one or more computer readable storage media, which when executed by a processor, cause the processor to:

determine if the inner loop is invariant with respect to an outer loop, wherein the outer loop is located within the candidate loop;

responsive to determining the inner loop is not invariant with respect to the outer loop, determine if loop invariants have one or more frequently utilized values; and responsive to determining the loop invariants have one or more frequently utilized values, perform loop versioning for the loop invariants.

* * * * *